United States Patent [19]
Hawkings

[11] Patent Number: 5,997,967
[45] Date of Patent: Dec. 7, 1999

[54] SIDE ENTRY DEVICE FOR SEALING WIRE BUNDLES

[76] Inventor: Robert Mark Hawkings, 2383 Lancaster Ct., Hayward, Calif. 94542

[21] Appl. No.: 08/059,043

[22] Filed: May 7, 1993

[51] Int. Cl.[6] .................................................. B65B 53/02
[52] U.S. Cl. .................... 428/34.9; 428/35.7; 428/36.9; 428/194; 428/343
[58] Field of Search ............... 174/DIG. 8, 71 R, 174/72 R; 428/343, 34.9, 35.7, 36.9, 194

[56] References Cited

U.S. PATENT DOCUMENTS

| | | | |
|---|---|---|---|
| 3,770,556 | 11/1973 | Evans et al. | 161/39 |
| 3,959,052 | 5/1976 | Stanek | 156/86 |
| 4,280,258 | 7/1981 | Kunze | 24/257 |
| 4,384,906 | 5/1983 | Molinari et al. | 156/86 |
| 4,442,155 | 4/1984 | Foertsch et al. | 428/99 |
| 4,518,448 | 5/1985 | Henry et al. | 156/86 |
| 4,560,828 | 12/1985 | Franckx et al. | 174/71 R |
| 4,699,821 | 10/1987 | Hallock | 428/192 |
| 4,731,271 | 3/1988 | Heucke et al. | 428/36 |
| 4,735,836 | 4/1988 | Giebel et al. | 428/36 |
| 4,795,509 | 1/1989 | De Bruycker | 174/DIG. 8 X |
| 4,860,799 | 8/1989 | Van Noten | 174/DIG. 8 X |
| 4,865,890 | 9/1989 | Erlichman | 174/DIG. 8 X |
| 4,900,596 | 2/1990 | Peacock | 428/34.5 |

FOREIGN PATENT DOCUMENTS

| | | |
|---|---|---|
| 3319168 | 11/1984 | Germany . |
| 4032376 | 10/1990 | Germany . |
| 989878 | 4/1965 | United Kingdom . |
| 2043729 | 2/1979 | United Kingdom . |

*Primary Examiner*—Jenna Davis
*Attorney, Agent, or Firm*—Herbert G. Burkard; Sheri M. Novack

[57] ABSTRACT

A side entry heat recoverable article (2) pre-formed to enable a wire bundle (4) to be easily positioned and maintained within the article prior to recovery of the article. The wire bundle snaps into an enlarged section (6) between tab portions (10, 12). An adhesive (24) is disposed on the interior surface of the article for securing the tab portions together and for sealing the wire bundle. Upon recovery of the article, the wire bundle is thereby sealed within the heat recoverable article. A heat recoverable tube (2'), including adhesive, undergoes a post processing step to form the slit sleeve (2) that can be easily handled and installed.

11 Claims, 2 Drawing Sheets

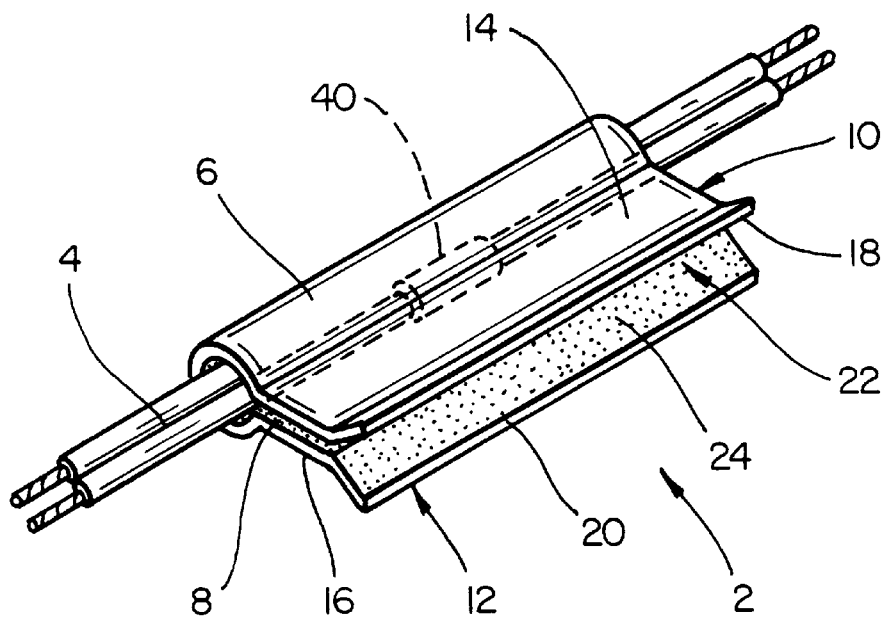
FIG_1
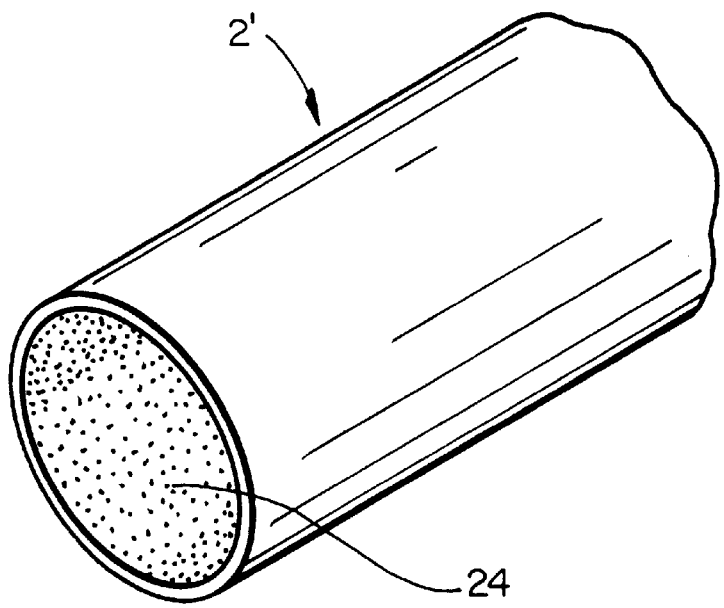
FIG_2

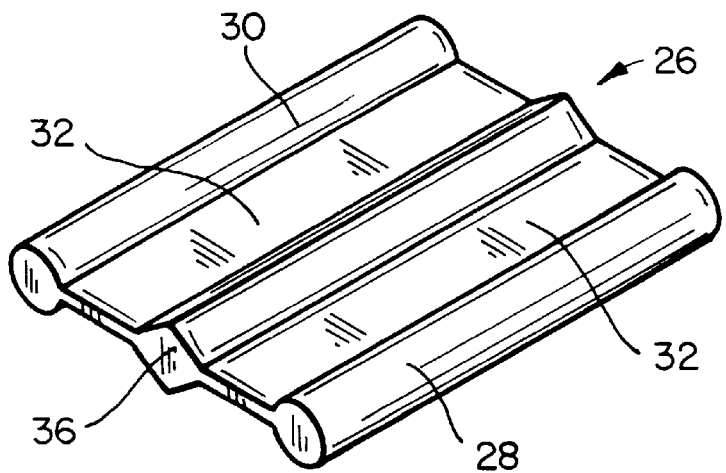
FIG_3
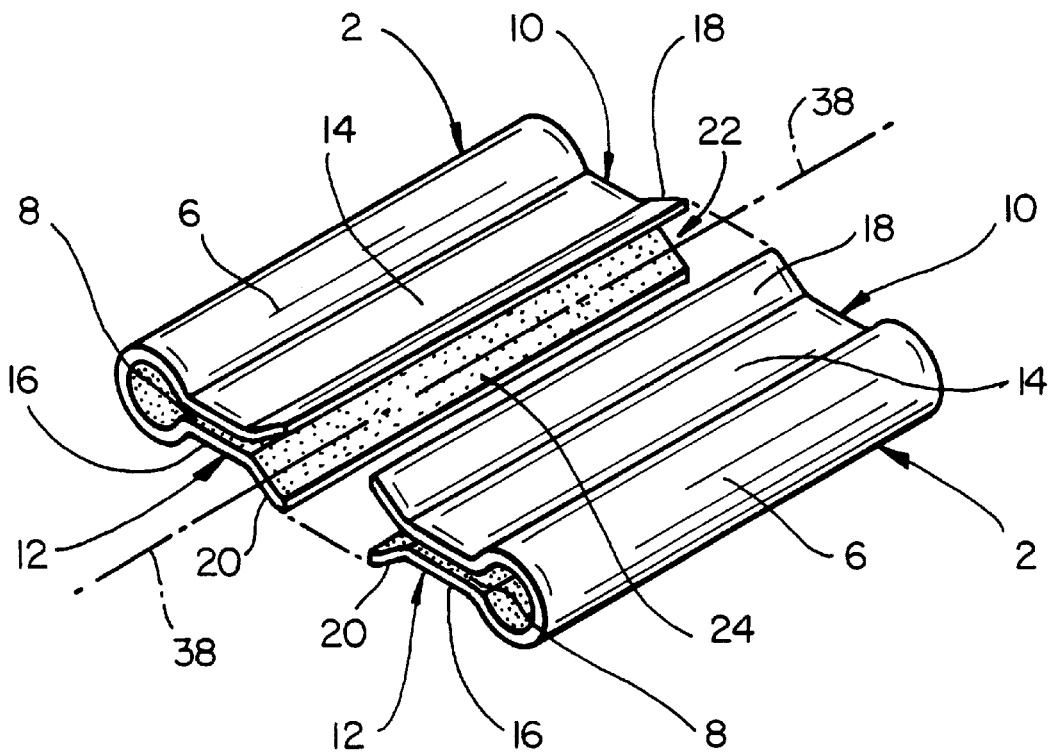
FIG_4

SIDE ENTRY DEVICE FOR SEALING WIRE BUNDLES

This invention relates to a side entry device for sealing a wire bundle.

BACKGROUND OF THE INVENTION

Heat recoverable insulating or corrosion resistant sleeves have found widespread application in protection and sealing of wire bundles.

Heat recoverable articles are well known. They are articles the dimensional configuration of which may be made substantially to change when subjected to heat treatment. Usually these articles recover, on heating, towards an original shape from which they have previously been deformed but the term "heat recoverable," as used herein, also includes an article, which, on heating, adopts a new configuration, even if it has not been previously deformed.

Attempts have been made to provide sleeves which may be installed at any point along a line without requiring access to its end, as is typically required by tubes. The problem most commonly encountered in constructing and installing such a wrap around or side entry article is the provision of a closure device capable of withstanding the considerable shrinkage forces exerted during recovery, and yet simple enough to be manufactured and used in a practical manner. Typical wrap around articles are also difficult to handle and install, tending to unwrap around the wire bundle while closure is effected, taking considerable time and skill. Examples of wrap around type heat recoverable articles can be found in U.S. Pat. Nos. 4,900,596; 4,735,836; 4,731,271; 4,699,821; 4,560,828; 4,518,448; 4,442,155; 4,280,258; 3,959,052 and 3,770,556; Great Britain Patent Application No. 2 043 729 A and German Patent Application 40 32 376 A1 which are hereby incorporated by reference for all purposes.

There is a need for a side entry heat recoverable article which is economical, easy to manufacture, and easy and quick to install.

SUMMARY OF THE INVENTION

A pre-formed side entry heat recoverable article enables a wire bundle to be maintained in position within the article prior to its recovery and sealing around the wire bundle. A heat recoverable tube undergoes a post processing step to form the side entry article that can be easily handled and installed around, for example, a wire splice.

In one aspect, the invention provides a heat recoverable pre-formed article comprising:

an enlarged section for receiving a wire bundle to be sealed, said enlarged section having a slit therein;

a pair of tab portions substantially aligned with each other and extending from said slit.

The tab portions each preferably comprise a substantially planar section disposed adjacent to each other such that the wire bundle snaps into the enlarged section. The planar sections are preferably biased toward each other and, upon insertion of the wire bundle into the enlarged section, said planar sections are spread apart and return to their original adjacent, biased position upon snapping of the wire bundle into the enlarged section. The term "biased" as used herein merely implies a tendency of the planar sections to return to their position adjacent to each other.

The tab portions may terminate in a flared end section which together form an opening therebetween for facilitating inserting of the wire bundle into the enlarged section.

The enlarged section preferably comprises a substantially circular section.

The heat recoverable article preferably comprises a crosslinked polymer, and more preferably comprises a polyolefin material.

An adhesive is preferably disposed on the inner surface of the article for sealing the wire bundle and/or for securing the ends of the tab portions together.

In another aspect, the invention provides a method of forming a heat recoverable article for sealing a wire bundle comprising:

providing a section of substantially circular heat recoverable tubing having a high temperature adhesive disposed therein;

positioning a mandrel inside said heat recoverable tubing, the mandrel having enlarged end sections, an enlarged center section and having flattened sections between said enlarged end sections and said enlarged center section;

applying pressure to said flattened sections while heating, recovering and cooling said heat recoverable tubing, thereby forming enlarged end sections, an enlarged center section and a pair of flattened tab portions between each of said enlarged end sections and said enlarged center section; and slitting said heat recoverable tubing at said enlarged center section to form a pair of slit tubes.

Other features and advantages of the present invention will appear from the following description in which the preferred embodiment has been set forth in detail in conjunction with the accompanying drawings.

BRIEF DESCRIPTION OF THE DRAWINGS

FIG. 1 is a perspective view of the preferred embodiment of the present invention.

FIG. 2 is a perspective view of a heat recoverable tube prior to pre-forming the present invention.

FIG. 3 is a perspective view of a mandrel employed in the pre-forming process of the present invention.

FIG. 4 is a perspective view of the preferred embodiment of the present invention after processing.

DETAILED DESCRIPTION OF THE PREFERRED EMBODIMENT

Referring now to the drawings, FIG. 1 illustrates a heat recoverable pre-formed sleeve 2 for maintaining and sealing together a wire bundle 4.

Heat recoverable sleeve 2 includes an enlarged section 6, preferably a substantially circular section, having a slit 8 formed at one side of the enlarged section. A pair of tab portions 10, 12 including substantially planar sections 14, 16, substantially aligned with each other extend outwardly from slit 8, away from enlarged section 6. Planar sections 14, 16 are disposed adjacent to each other and are biased toward each other such that upon insertion of wire bundle 4 into enlarged section 6 between tab portions 10, 12, the wire bundle causes planar sections 14, 16 to spread apart until wire bundle 4 snaps into enlarged section 6. Planar sections 14, 16 then return to their original position adjacent to each other.

Planar sections 14, 16 each terminate in an outwardly flared end section 18, 20, which together, form an opening 22 therebetween for facilitating insertion of wire bundle 4 between the planar sections. However, it is within the scope of the present invention to provide planar sections 14, 16 without outwardly flared end sections 18, 20.

An adhesive 24 is disposed on the interior surface of sleeve 2, including the inner surface of enlarged section 6 and tab portions 10, 12. Adhesive on the inner surface of tab portions 10, 12 is employed to form a closure of sleeve 2 by sealing the interior surface of the tab portions together. Adhesive on the inner surface of enlarged section 6 serves to provide a seal for wire bundle 4.

Sleeve 2 comprises a crosslinked polymer, preferably a rigid polyolefin flame-retarded tubing comprising high density polyethylene. Adhesive 24 is preferably a polyamide based adhesive, but any suitable adhesive which is activated by heat may be used.

In use, wire bundle 4 is inserted between outwardly flared end sections 18, 20, through opening 22 and snapped into enlarged section 6. Planar sections 14, 16 are spread apart during insertion of the wire bundle and return to their original position adjacent to each other as the wire bundle snaps into enlarged section 6. Before insertion of wire bundle 4 into enlarged section 6, a splice may be made in the wire bundle, as indicated by numeral 40 in FIG. 1. Because wire bundle 4 snaps into position in pre-formed sleeve 2, even prior to recovery of sleeve 2, the wire bundle will not easily disengage from sleeve 2. The complete assembly can be easily handled and installed, saving considerable time to place the wire bundle properly and securely within sleeve 2.

To recover the article, tab portions 10, 12 are clamped together. This may be accomplished using the modular clip assembly described in U.S. Pat. No. 4,123,047 which is hereby incorporated by reference for all purposes. The assembly is then heated with a belt heater or hot air and sleeve 2 is fully recovered. Adhesive 24, disposed on the inner surface of sleeve 2, melts, resulting in closure of the sleeve by sealing together of tab portions 10, 12, and also sealing of wire bundle 4.

Sleeve 2 is pre-formed from a substantially circular heat recoverable tube 2', as seen in FIG. 2. Heat recoverable tube 2' includes adhesive 24 disposed on its inner surface. Tube 2', partially recovered around a mandrel 26, results in two joined pre-formed sleeves 2 which may then be separated by splitting or cutting. The percent recovery of tube 2' to form pre-formed sleeve 2 is very small, preferably less than 10 per cent. Adhesive 24 is not heated sufficiently to allow it to be activated. To further ensure that the adhesive does not adhere, mandrel 26 may comprise or be coated with a material, such as teflon.

Mandrel 26 is shaped such that the outer configuration of the mandrel body forms the basis for the inner configuration of pre-formed sleeve 2. Thus, tube 2' adopts the desired pre-formed configuration, resulting in two joined pre-formed sleeves 2 joined along a line of intersection 38 of outwardly flared end sections 18, 20, as shown in FIG. 4. These two joined pre-formed sleeves 2 are then slit along their line of intersection 38, i.e., through the outwardly flared end sections, to achieve two separate pre-formed sleeves 2.

Mandrel 26 comprises a relatively thin rectangular body and is symmetrical about a plane. Enlarged rounded protuberances 28, 30 are positioned at opposite sides of the mandrel body. Flats 32 are disposed on both sides of the mandrel body between and connecting protuberances 28, 30. Upon partial recovery, pressure is applied at flats 32, forming planar sections 14, 16. Protuberances 28, 30 shape the interior surface of enlarged section 6. Protuberances 28, 30 preferably have a circular configuration; however, it should be noted that protuberances 28, 30 may have any configuration desired to form enlarged section 6 for receiving wire bundle 4. A central outwardly extending protrusion 36 is preferably disposed midway between protuberances 28, 30. Outwardly extending protrusion 36 extends parallel to protuberances 28, 30 and is generally coincident with the axis of symmetry of mandrel 26. Outwardly extending protrusion 36 delineates the interior surface of outwardly flared end sections 18, 20. It should be noted that if it is desired to form planar sections 14, 16 without outwardly flared end sections 18, 20, mandrel 26 will be formed without protrusion 36 such that a single flat will extend on either side of the mandrel body from protuberance 28 toward protuberance 30.

It is within the scope of the present invention to pre-form sleeve 2 by first splitting a heat recoverable tube 2', maintaining the slit tube in the shape of the desired final configuration of sleeve 2, and then partially recovering the tube to form pre-formed sleeve 2.

Variations and modifications can be made to the preferred embodiment without departing from the scope of the present invention, which is limited only by the following claims.

What is claimed is:

1. A heat recoverable pre-formed article comprising:
   a substantially hollow enlarged section for receiving a wire bundle to be sealed, said enlarged section having a slit therein;
   a pair of tab portions disposed adjacent to each other and extending outwardly form said slit so as to be substantially aligned with each other;
   wherein said tab portions are biased toward each other such that upon insertion of the wire bundle into said enlarged section, said tab portions are spread apart and return to their original adjacent, biased position upon snapping of the wire bundle into said enlarged section, whereby said wire bundle is restrained within said hollow enlarged section prior to heat recovery without the application of a fastener over an exterior of said tab portions.

2. The article as defined in claim 1 wherein said tab portions each comprise a substantially planar section.

3. The article as defined in claim 2 wherein said tab portions each terminate in a flared end section which together form an opening therebetween for inserting the wire bundle into said enlarged section.

4. The article as defined in claim 1 wherein said enlarged section comprises a substantially circular section.

5. The article as defined in claim 1 further comprising an adhesive disposed on the inner surface of the article.

6. The article as defined in claim 1 wherein said heat recoverable pre-formed article comprises a crosslinked polymer.

7. The article as defined in claim 1, wherein said heat recoverable pre-formed article comprises a rigid polyolefin material which enables the return of said tab portions to their original adjacent, biased position.

8. A heat-recoverable pre-formed article comprising:
   a substantially hollow enlarged section for receiving a wire bundle to be sealed, said enlarged section having a slit therein;
   a pair of tab portions disposed adjacent to each other and extending outwardly from said slit so that each tab portion is substantially aligned with the other tab portion and including a flared end section at the end of said tab portion remote from said slit forming an opening therebetween for inserting the wire bundle through said opening and into said enlarged section such that the wire bundle snaps into said enlarged section;

wherein said tab portions are biased toward each other such that upon insertion of the wire bundle through said flared end section into said enlarged section, said tab portions are spread apart and return to their original adjacent, biased position upon snapping of the wire bundle into said enlarged section; and an adhesive disposed on the inner surface of said enlarged section and said pair of tab portions.

9. The article as defined in claim 1 wherein said tab portions and said enlarged section are substantially the same thickness.

10. The article as defined in claim 8 wherein said tab portions and said enlarged section are substantially the same thickness.

11. The article as defined in claim 8 wherein said tab portions each comprise a substantially planar section.

* * * * *